(12) United States Patent
Hudson et al.

(10) Patent No.: US 8,366,301 B2
(45) Date of Patent: Feb. 5, 2013

(54) ILLUMINATED BOLLARD WITH SAFETY LIGHT FOR LOADING DOCK

(75) Inventors: Dale R. Hudson, Jamesville, NY (US); Jay Tillman, Southbury, CT (US)

(73) Assignee: Jamas Enterprises LLC, Syracuse, NY (US)

( * ) Notice: Subject to any disclaimer, the term of this patent is extended or adjusted under 35 U.S.C. 154(b) by 338 days.

(21) Appl. No.: 12/872,307

(22) Filed: Aug. 31, 2010

(65) Prior Publication Data

US 2010/0320918 A1 Dec. 23, 2010

Related U.S. Application Data

(63) Continuation-in-part of application No. 12/545,894, filed on Aug. 24, 2009, now Pat. No. 8,136,964.

(60) Provisional application No. 61/091,742, filed on Aug. 26, 2008.

(51) Int. Cl.
*F21V 21/29* (2006.01)
*F21S 13/10* (2006.01)

(52) U.S. Cl. ........ 362/276; 362/153; 362/431; 362/231; 362/368

(58) Field of Classification Search .................. 362/276, 362/411, 394, 295, 368, 431, 362, 253, 234, 362/145, 153, 231, 240, 802
See application file for complete search history.

(56) References Cited

U.S. PATENT DOCUMENTS

| | | | | |
|---|---|---|---|---|
| 6,652,114 B2 * | 11/2003 | Ancel | ........................... | 362/147 |
| 7,533,431 B2 * | 5/2009 | Hochstein et al. | ............ | 362/427 |
| 2005/0254249 A1 * | 11/2005 | Robbins, III | .................. | 362/485 |
| 2006/0109667 A1 * | 5/2006 | Flaherty et al. | ............... | 362/431 |
| 2006/0133097 A1 * | 6/2006 | Doric et al. | ................... | 362/401 |

* cited by examiner

*Primary Examiner* — Bao Q Truong
(74) *Attorney, Agent, or Firm* — Bernhard P. Molldrem, Jr.

(57) ABSTRACT

A combination dock light, safety light, and bollard serves the purposes of all three, without having any sensitive structure projecting out from the bollard into the traffic lane at the loading dock. A trailer lamp assembly within the bollard projects out a window cutout at an upper end of the tubular metal body of the bollard. A red/green safety light is visible through an elongated cutout on the proximal side of the bollard. A photo eye turns the lamp on when the loading dock door is opened, and off when the dock door is closed, and also switches the safety light to green or to red depending on whether the dock door is opened or closed.

10 Claims, 13 Drawing Sheets

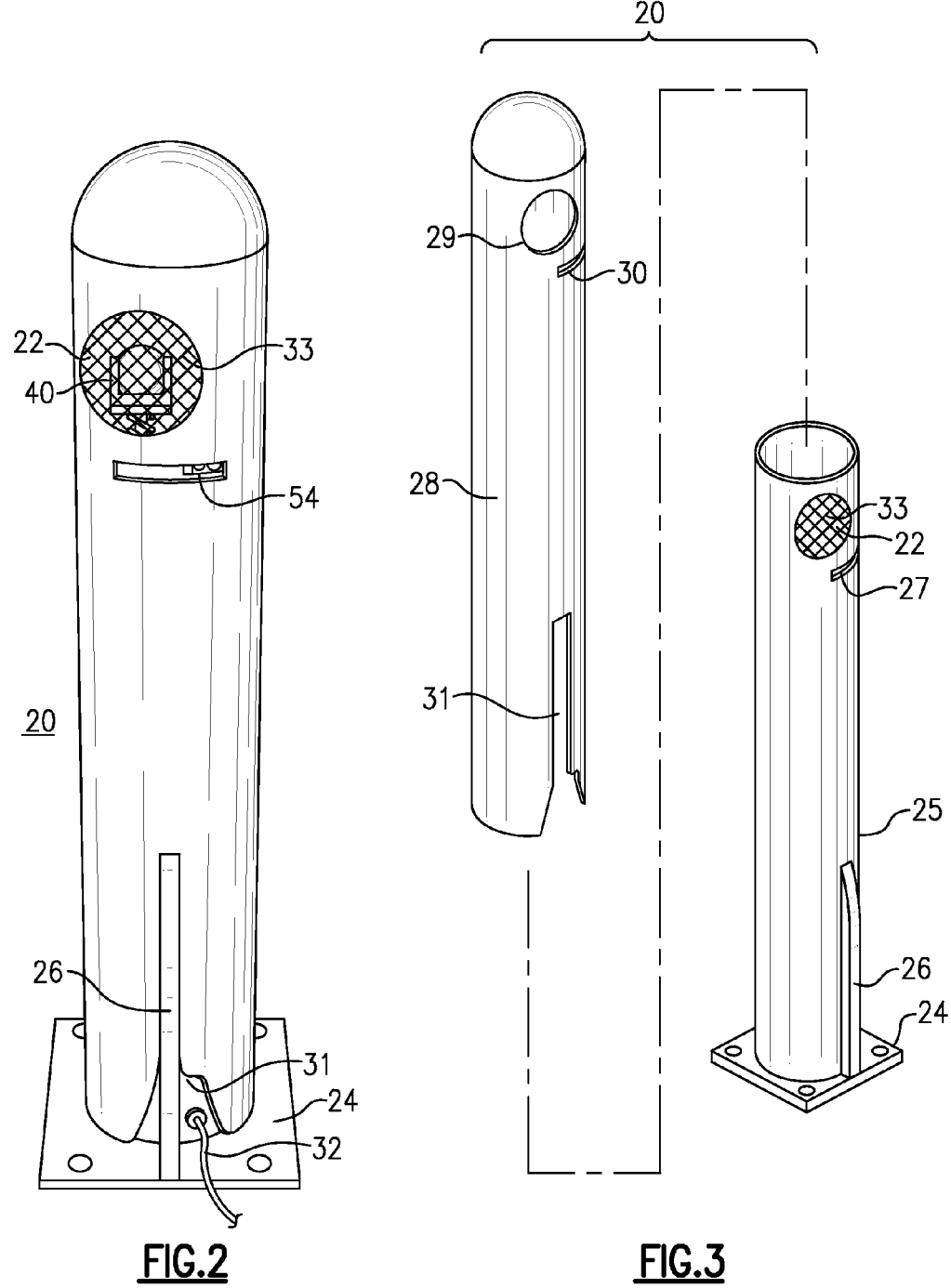

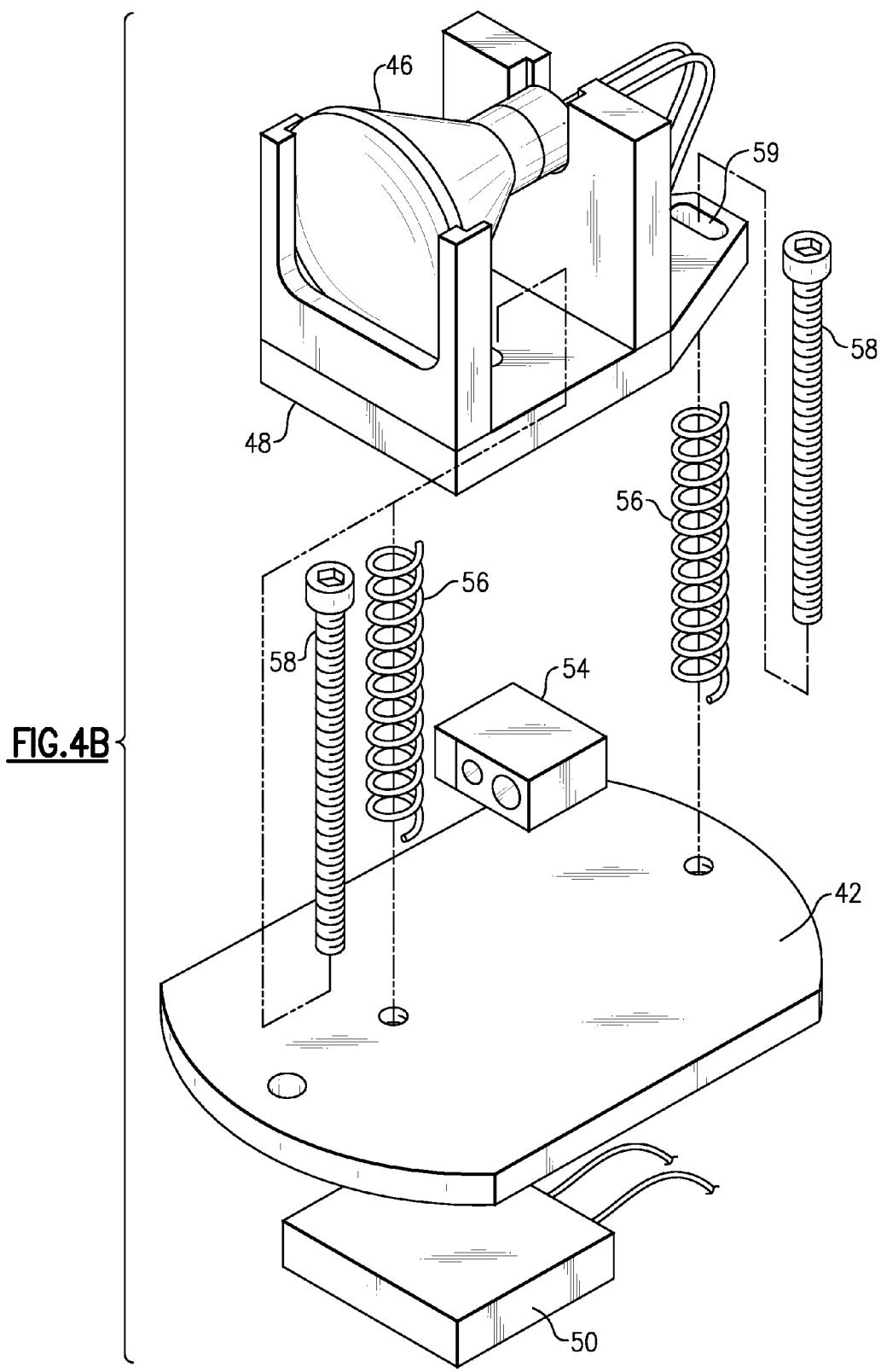

ILLUMINATED BOLLARD WITH SAFETY LIGHT FOR LOADING DOCK

RELATED APPLICATIONS

This is a continuation-in-part of our application Ser. No. 12/545,894, filed Aug. 24, 2009, now U.S. Pat. No. 8,136,964, and which claims priority under 35 U.S.C. §119(e) of U.S. Provisional Pat. Application No. 61/091,742, filed Aug. 26, 2008, the contents of which are incorporated by reference herein.

BACKGROUND OF THE INVENTION

This invention relates to loading dock lighting systems, of the type intended to shine light inside a tractor trailer, van, railroad car, etc., when present at a loading dock at a warehouse or other shipping or receiving location. Loading vehicles, such as fork lifts and pallet lifters, are used in bringing goods and materials into a trailer or out of a trailer when the same is stationed at a loading dock. In order to help provide enough light for the fork lift operator during loading or unloading, it is often necessary to use a dock light. These items typically project from some structure, such as the edges or vertical guides of the dock door or gate, or can sometimes be installed on a post or bollard at the loading dock gate. One example of this is discussed in U.S. Pat. No. 7,101,064. These dock lights project out from the doorway or from the side of the bollard into the lanes that are traversed by the fork lifts or other equipment, and thus they are subject to collision damage. The docking equipment industry is aware of this problem, but has been unable to address it.

Dock safety lights are typically employed at loading dock doors to signal to the fork lift operator, on the inside or proximal side of the dock door, whether the dock door is open or closed, and also to signal to the operator of a truck or tractor on the outside or distal side whether the dock door is closed or open. The standard convention is that when the dock door is closed, the inside safety light shines a red light and the outside safety light unit shines a green light, and when the dock door is open, the inside safety light shines green and the outside safety light shines red. These are mounted on a wall alongside the door on the interior and exterior, respectively, and let the fork lift operator know, with a green light, that the operator can proceed safely to load or unload the trailer or truck body, or with a red light that the door is closed and he should not proceed. When the dock door is open, the outside safety light signals with a red light that the truck operator should not drive away, and when the dock door is closed, signals with a green light that it is now safe to drive away from the loading dock.

Typically wall space is quite limited, especially on the inside of the shipping/receiving dock area, and there is also limited space for electrical wiring and cabling to the safety light units and to presence sensors that detect whether the dock door is open or closed. The inside safety light unit has to be mounted high on the wall, and it can be difficult for the fork lift operator to see the safety light if the operator is carrying a high or elevated load, which is typically the case during a loading operation.

OBJECTS AND SUMMARY OF THE INVENTION

Accordingly, it is an object of the present invention to provide a dock light system and dock safety light system that avoid the drawbacks of the prior art.

It is another object to provide a combination dock light, safety light, and bollard that serves three purposes, without requiring any sensitive structure projecting out from the bollard into the fork lift traffic lane at the loading dock.

It is a more specific object to provide an illuminated bollard which is of simple construction, with clean lines and capable of providing good visibility into the interior of the truck or van being loaded or unloaded, and with incorporated safety light that is always visible to the inside operator approaching the loading dock.

In accordance with one aspect of the present invention, an illuminated bollard is adapted to be installed adjacent a loading dock door and to provide illumination into a truck body or trailer positioned at the loading dock door and distally thereof. The illuminated bollard has a vertical tubular metal body (typically cylindrical, but possibly of other shapes); and a base plate that serves as a means for affixing the tubular metal body of the bollard to a horizontal floor surface. Alternatively, the bollard can be anchored into the concrete floor during construction. A first window cutout is formed at an upper end of said bollard tubular metal body on a distal-facing side thereof (i.e., on the side looking out the dock door into the truck body or trailer). A lamp assembly, module, or capsule had a base plate, with directional lamp assembly seated on the capsule base plate inside the upper end of bollard tubular metal body. The lamp assembly base plate is secured within the bollard tubular body, such that the a directional lamp that is supported on the base plate provides its beam of light oriented generally horizontally and in the distal direction through the first bollard window cutout. An automatic sensor switch, such as an optical light switch, is adapted to switch the directional lamp on when the loading dock door is opened and to switch the lamp off when the loading dock door is closed. A power supply provides electrical power to the directional lamp. There is also a second window cutout on the forward or proximal side of the tubular metal body, and the lamp capsule also has a safety light assembly supported on the base plate with red and green safety lights positioned to be visible through the second window cutout. These safety lights are actuated by the automatic sensor switch, so that the red light is on when the sensor switch detects that the dock door is closed, and the green light is on when the sensor switch detects that the dock door is open. The directional lamp, safety light assembly, and optical light switch can all be mounted onto, or above, the lamp assembly base plate. The directional lamp can include a lamp holder supported on one or more compression springs held in place by long machine screw(s) that pass through the holder and springs and into the base plate. The lamp holder for the directional lamp positions the lamp in a horizontal orientation, but also permits vertical adjustment and some left to right adjustment of the lamp beam direction.

In a preferred mode, the illuminated bollard can have a plastic protective sleeve fitted over its tubular metal body, and the plastic sleeve has window cutouts therein aligned with the first and second window cutouts of the tubular metal body. Light reflected from internal surfaces of the bollard illuminates the top of the sleeve, to increase visibility of the bollard.

Preferably, the sensor switch can be an optical switch, such as a photo eye unit operative to detect light (e.g., infrared) reflected from the loading dock door when the door is closed. To assist detection of reflected light, a strip of reflective tape may optionally be positioned on the dock door so that it is in alignment with the photo eye unit when the door is in its closed position.

The lamp holder is supported on one or more springs above the base plate, and these springs act to absorb some of the shock of collision with the fork lift or loading equipment and protect the lamp from damage.

An acoustic sensor, such as an ultrasonic or sonic detector, may be used rather than the optical switch to detect the presence of the door surface when the loading dock door is down or closed and to turn the dock light assembly on and off. A mechanical sensor, such as a microswitch with a wire whisker, may be used in some applications. A manual switch may also be used.

Metal mesh screen(s) may positioned in the bollard window cutouts to protect the lamp assembly.

The illuminated bollard may be present on one side only or on both sides of the loading dock door, as needed.

In practice, the light capsule is electrically coupled to an outside safety light unit that is mounted alongside the dock door on the exterior of the dock area. This is connected by cabling to the bollard lamp assembly capsule, so that the outside safety light is actuated, i.e., illuminated green or red, by the same dock door sensor.

The safety lights, both within the bollard and at the external side of the dock door, are actuated by the same sensor that turns the bollard dock lamp on and off, by sensing whether the dock door is open or closed. When the door is open, the directional lamp is on, the inside green safety light is on and the outside red safety light is on. When the dock door is closed, the directional lamp is off, the inside red safety light is on and the outside green safety light is on.

Including the indoor safety light with the dock lamp inside the bollard positions the inside safety lights for optimal visibility to the fork lift operator, especially when carrying the load in a raised position. This arrangement also minimizes the amount of cabling needed, and simplifies the door sensor arrangement. This also resolves the question of mounting on the inside of the dock door, where available wall space is always quite limited.

The above and many other objects, features, and advantages of this invention will be more fully appreciated from the ensuing description of a preferred embodiment, which is to be read in conjunction with the accompanying Drawing.

BRIEF DESCRIPTION OF THE DRAWING

FIG. 2 is a front perspective view of the lamp assembly of this embodiment.

FIG. 3 is an assembly view of the illuminated bollard of this embodiment.

FIG. 4B is an assembly view of the lamp assembly of this embodiment.

DETAILED DESCRIPTION OF THE PREFERRED EMBODIMENT

Figure 1:
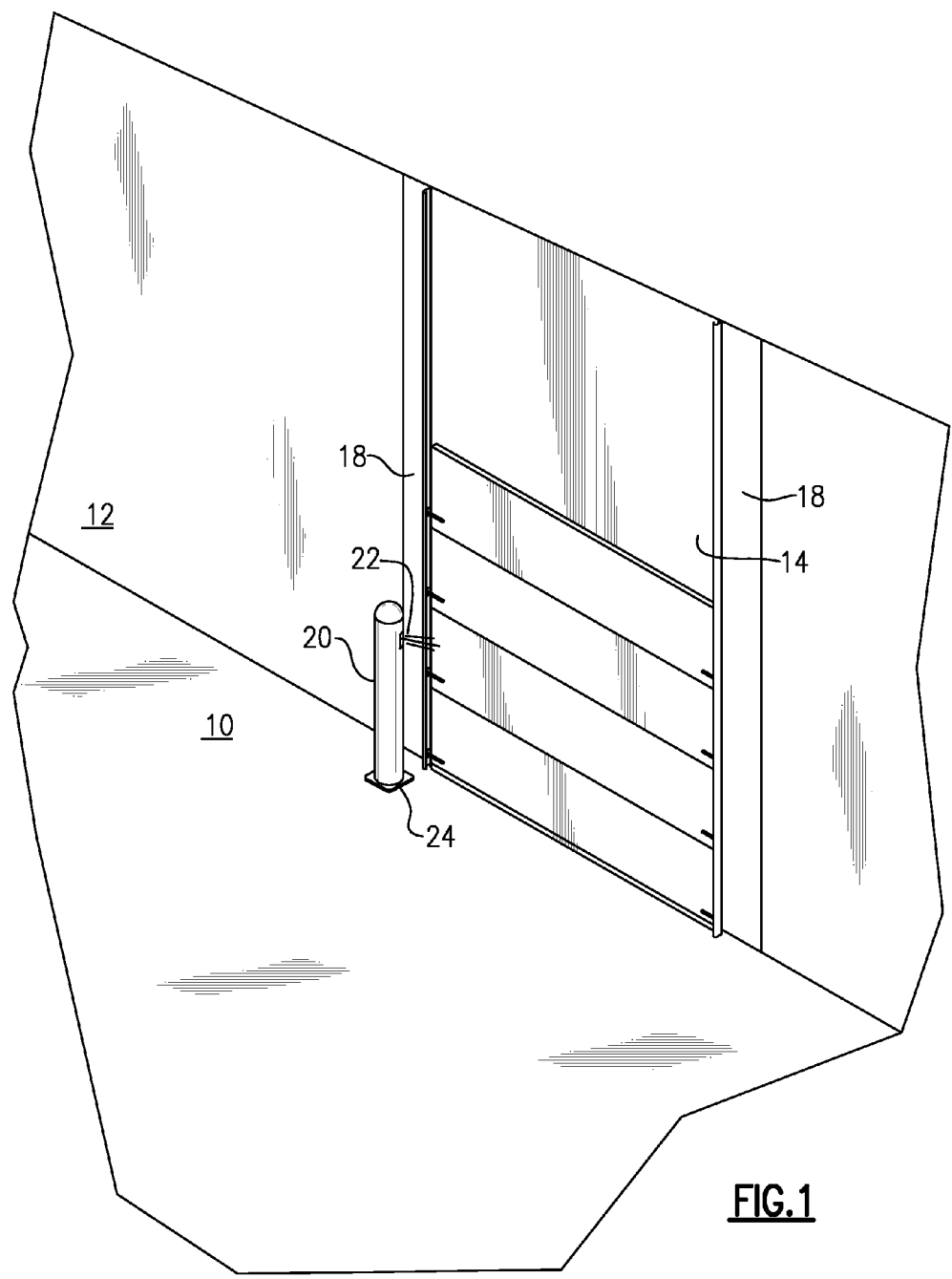
FIG. 1 is a perspective view of loading dock, employing an illuminated bollard according to one embodiment of the present invention.

With reference now to the Drawing, FIG. 1 shows the interior of a loading dock area of a warehouse or other shipping or receiving area, with a floor 10, wall surface 12, and a dock door 14. The dock door slides up and down in vertical door guides 18 at its left and right sides. The dock door 14 is opened, by lifting it upwards, to access the interior of a truck body, van, or trailer that has been parked or spotted at the dock gate.

A bollard 20, i.e., a strong steel post, is affixed to the dock floor 10 just in front of the door guide 18 to protect the door and guide from accidental bumping by a fork lift or other loading equipment as it goes through the open dock door 14 into and out of the truck that is being loaded or unloaded. Typically, there is a bollard at each side of the loading dock gate, but only one is shown here for purposes of simplicity. One of the two bollards is illuminated, and the other is of the standard type. The bollards can be cylindrical or pipe bollards, although other shapes could be used.

This bollard 20 is an illuminated bollard, with a lamp device or assembly within it, and which projects its light in the distal direction, through a window cutout or opening 22 on the distal side of the bollard, at or near the top thereof. Here, the window cutout 22 and the internal lamp assembly are about forty inches (e.g., 100 cm) above the floor or deck of the dock area. A mounting plate 24 is shown here at the base of the bollard 20 for permanently mounting the same to the floor. Depending on the lighting conditions inside the warehouse, and also depending upon the sensitivity of the equipment as discussed below, reflective tape may be applied to the dock door.

As shown in more detail in FIG. 2, the bollard 20 is in the form of a tubular cylindrical body 25, i.e., a metal pipe, with the window cutout 22 formed as a generally rounded opening near the top end. As seen in FIG. 3 a support gusset 26 on the distal side of the tubular body 25 is affixed to the body 25 and to the mounting plate 24. Also, a protective plastic sleeve or cover 28 fits over the body 25, and this cover has a matching opening 29 that aligns with the bollard window opening 22. A rectangular opening 27 in the tubular body 25 below the window cutout 22 serves as a window for an infrared optical door sensor, to be discussed shortly, and there is a rectangular cutout 30 in the sleeve 28 that aligns with the rectangular opening 27 of the tubular metal body. There is a vertical slot 31, i.e., a keyway member that fits over the gusset 26, and serves to align the position of the sleeve 28 on the metal body 25, such that when the sleeve 28 is installed over the bollard body 25, that the circular cutout 29 aligns with the window opening 22, and the rectangular cutout 30 aligns with the opening 27.

An electrical cord 32 emerges from the base of the bollard, as shown here, and can be plugged into a conventional power outlet. Alternatively, the bollard can be direct-wired.

A mesh screen 33 is affixed into the window 22 and serves to protect the lamp assembly 40 within the bollard 20 (the lamp assembly 40 is visible through the window 22 and screen 33 in FIG. 2). The screen 33 reflects some of the light produced from the lamp assembly, and this reflected light illuminates the top part of the sleeve, which is made of a translucent plastic material. This increases the visibility of the bollard when the lamp assembly is on. The mesh screen is omitted from the view in FIG. 5, but can be understood to be welded or attached with fasteners on the inner side of the window opening 22. A similar screen may be employed at the photo switch opening 27, if desired. In some possible embodiments, the screen or screens may be incorporated into the sleeve 24.

Figure 5:
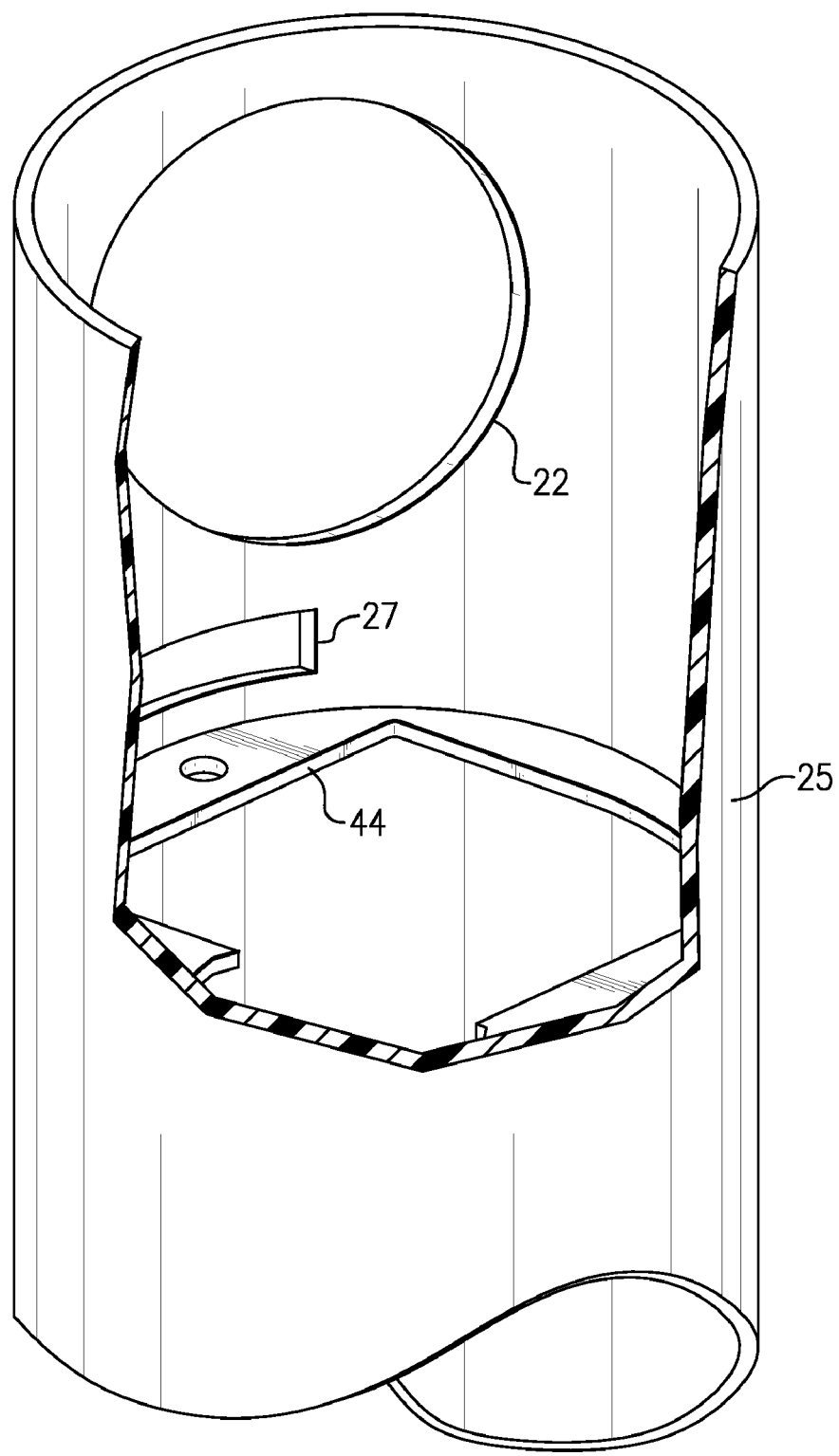
FIG. 5 is a perspective cutaway view of the top of the bollard tubular metal body.

The lamp assembly 40 can be removably installed through an open top of the tubular metal body 25. A base plate 42 of the light assembly 40 rests upon a sub-base 44 that is affixed horizontally to the inside surface of the tubular metal body 25 just below the lower edge of the opening 27. As shown in FIG. 5, this sub-base can be in the form of a flange that projects inward a short distance from the wall of the bollard tubular body 25, so as to leave an open central region.

Figure 4A:
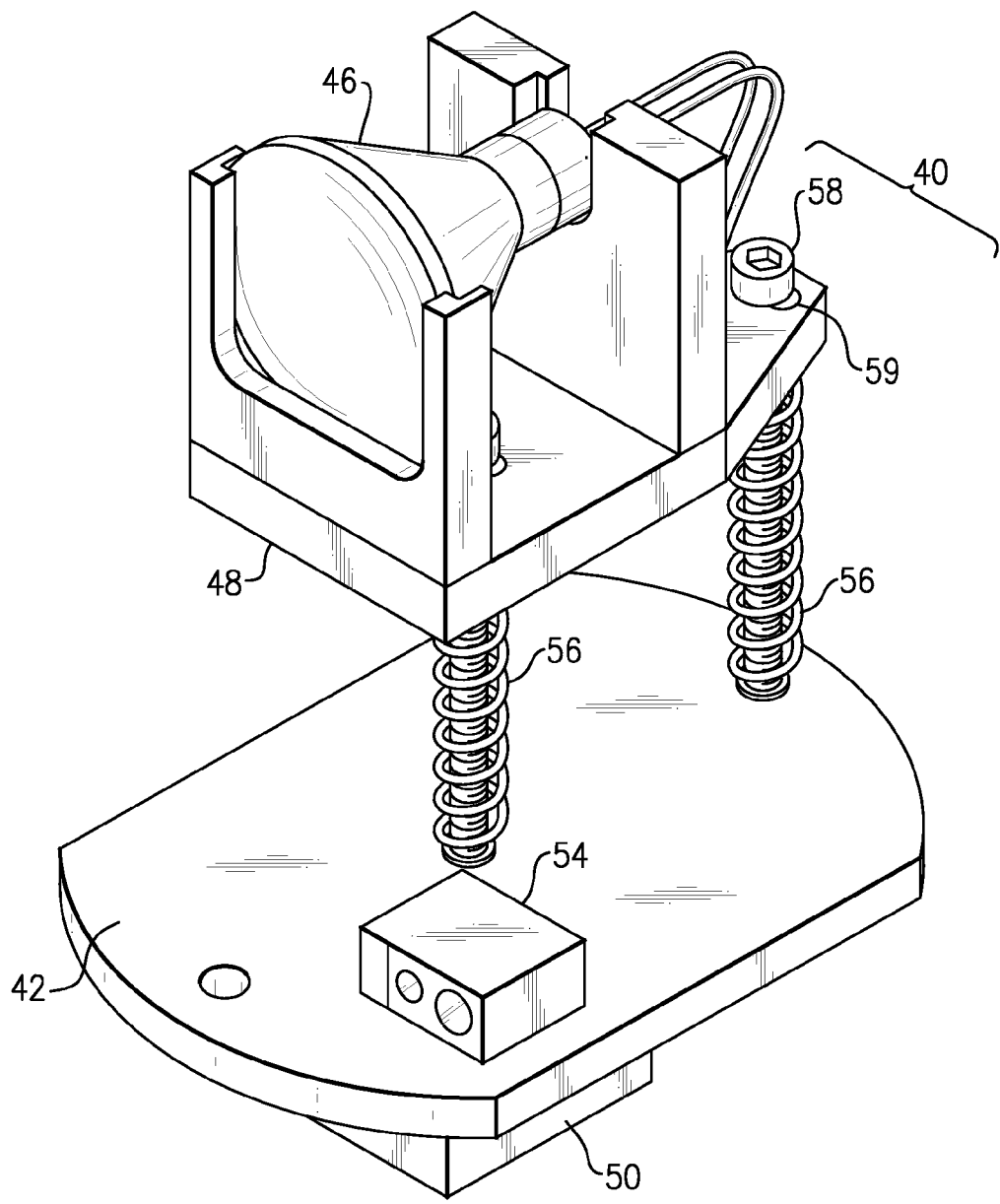
FIG. 4A is a perspective view of the lamp assembly.

On the light assembly as shown in exploded assembly view in FIG. 4B, and in the perspective view of FIG. 4A, a directional lamp 46, i.e., a reflector light or flood light, is held on a lamp holder 48 that is mounted above the lamp assembly base plate 42. A power supply 50 is mounted onto the lower side of the base plate 42. An electric eye or photo switch 54 uses visible light or other radiation that is reflected from the door 14, and which passes back through the bollard cutout 27, to turn the lamp 46 on when it detects that the door 14 has been lifted open, and to shut the lamp 46 off when it detects that the dock door 14 has been closed.

The lamp holder 48 has a base member that is supported on one or more compression springs 56, which are held in place with long machine screws 58 or equivalent threaded members, which pass through openings in the lamp holder 48, then through the springs 56 and into threaded openings in the base plate 42. There is an elongated, generally bow-shaped screw opening 59 at the back end of the lamp holder 48, and this allows some lateral movement of the back of the lamp holder, so that the lamp beam direction can be adjusted from left to right. The screws 58 can be adjusted up or down to change the vertical direction of the lamp beam, as well. Thus, the arrangement as shown here with the springs 56 and machine screws 58 allows for both lateral (left to right) and vertical (up and down) adjustment of the direction of the beam of the lamp 46. The springs also serve to cushion the lamp holder 48 against shocks in the event that a forklift or other vehicle collides with the bollard 20. In some embodiments, rubber grommets or cushions can be positioned to absorb the shock of collision to protect the lamp assembly.

The lamp assembly 40 can dropped into place on top of the fixed sub-base 44, as shown in FIG. 5, with the lamp 46 oriented to shine in a generally horizontal and distal direction, out through the bollard window cutout 22. The entire assembly is removable for repair or replacement, leaving the sub-base 44. A standard electrical connector (not shown here) may be used for quick connect and disconnect of the power supply 50 with the power conductors within the bollard tubular body 25.

As mentioned before, the bollard 20 can have a different profile, e.g., square or oblong, and the door open-close detection can be carried out by means other than the electric eye switch. The bollard lamp window cutout or opening 22 is round in this embodiment, but could just as well be another shape. In this embodiment there are separate cutouts 22 and 27 for the lamp and the photo switch, but in some embodiments, the two could use a common cutout or opening.

Another embodiment of the bollard light of this invention, which incorporates both a dock light and safety light, is shown in FIGS. 6 to 13. In this embodiment, similar components and features are identified with the same reference numbers but raised by 100.

Figure 6:
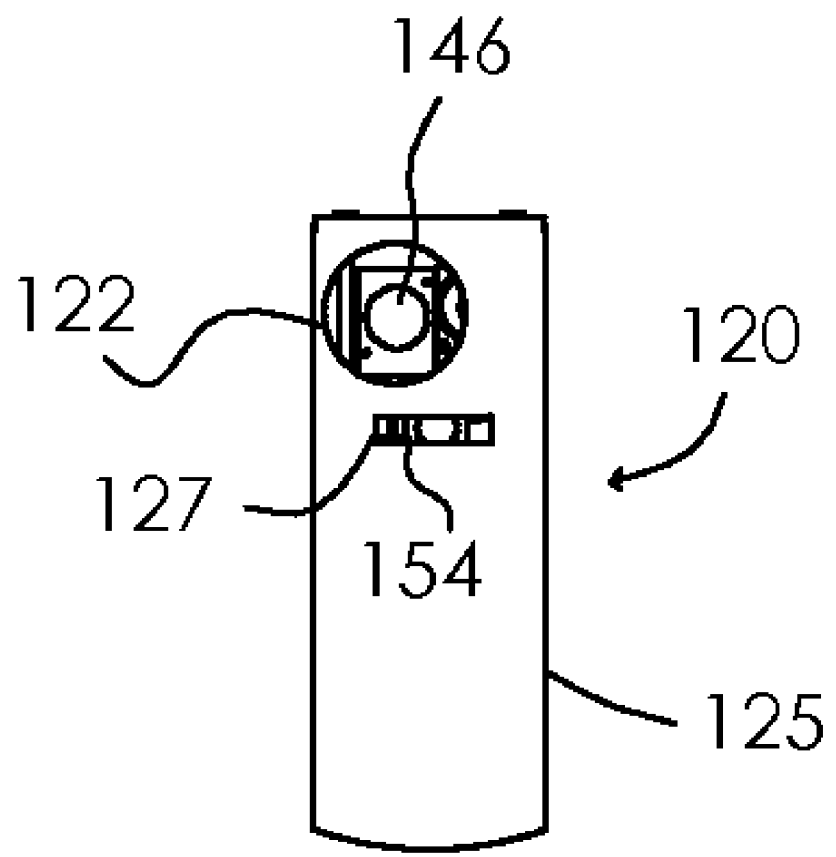
FIG. 6 is a proximal perspective view of a bollard light according to another embodiment of this invention.
Figure 7:
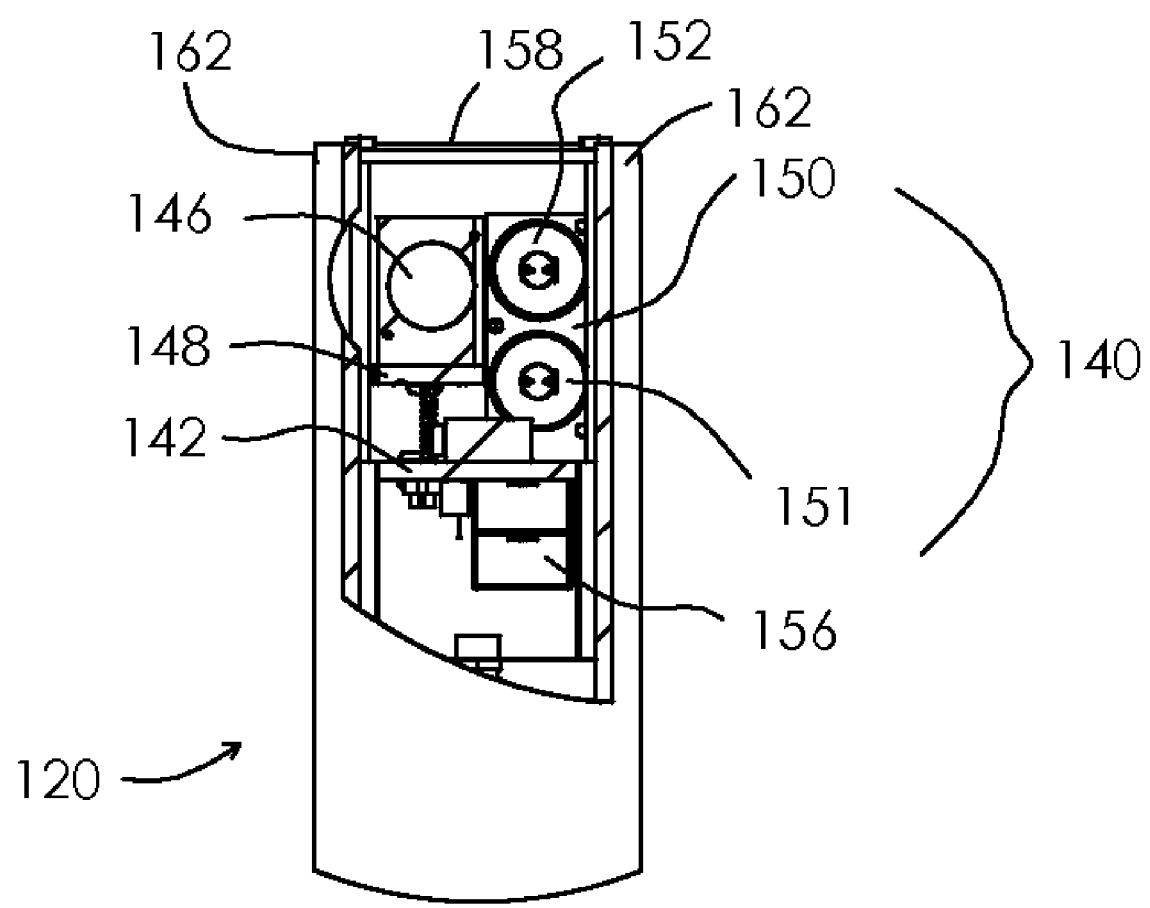
FIG. 7 is a partly cut-away view thereof showing the lamp capsule containing the dock light and safety light.
Figure 8:
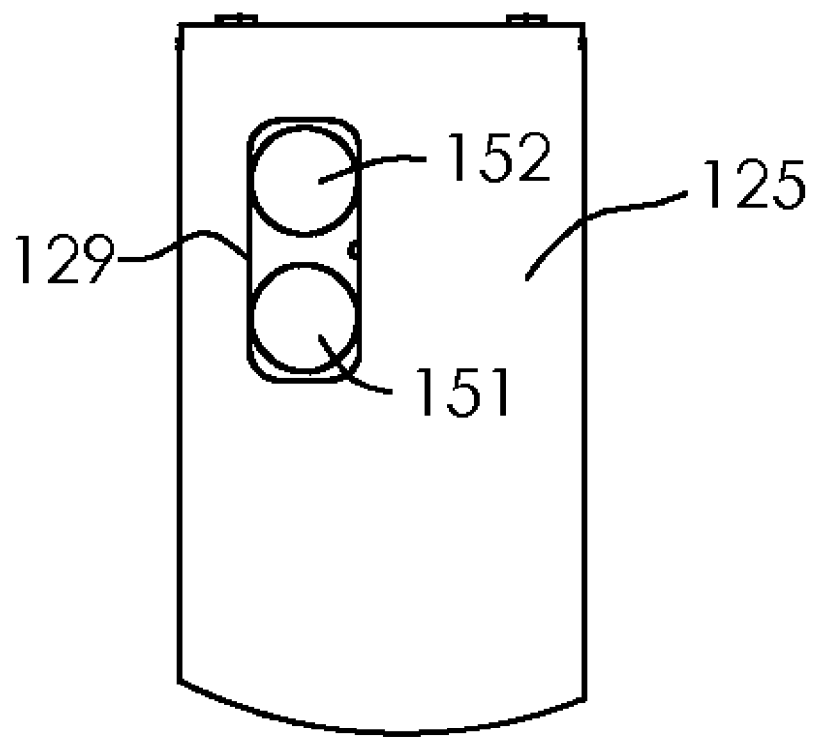
FIG. 8 is a distal perspective view thereof showing the safety light.
Figure 9:
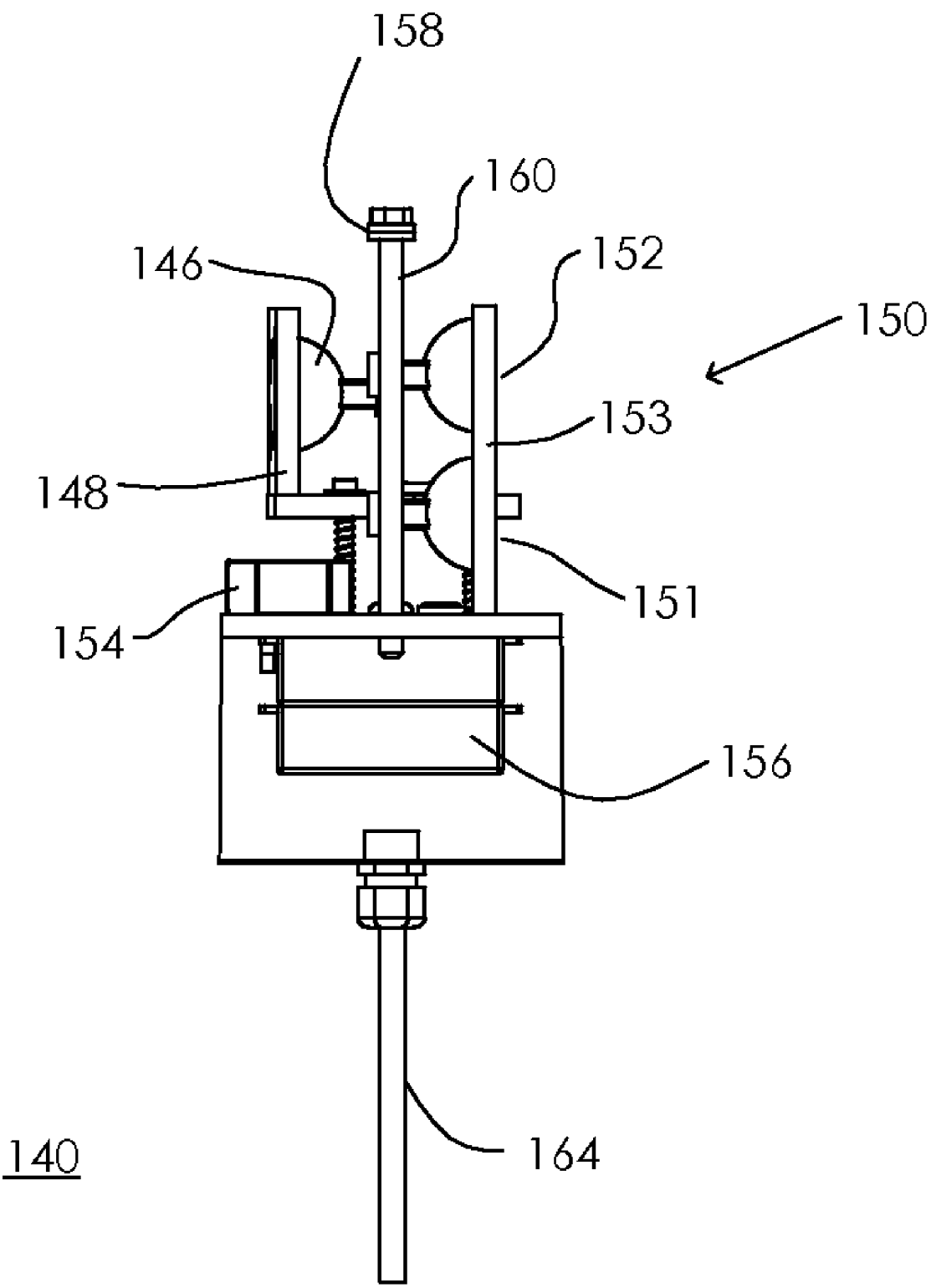
FIG. 9 is a side elevation of the lamp capsule thereof.
Figure 10:
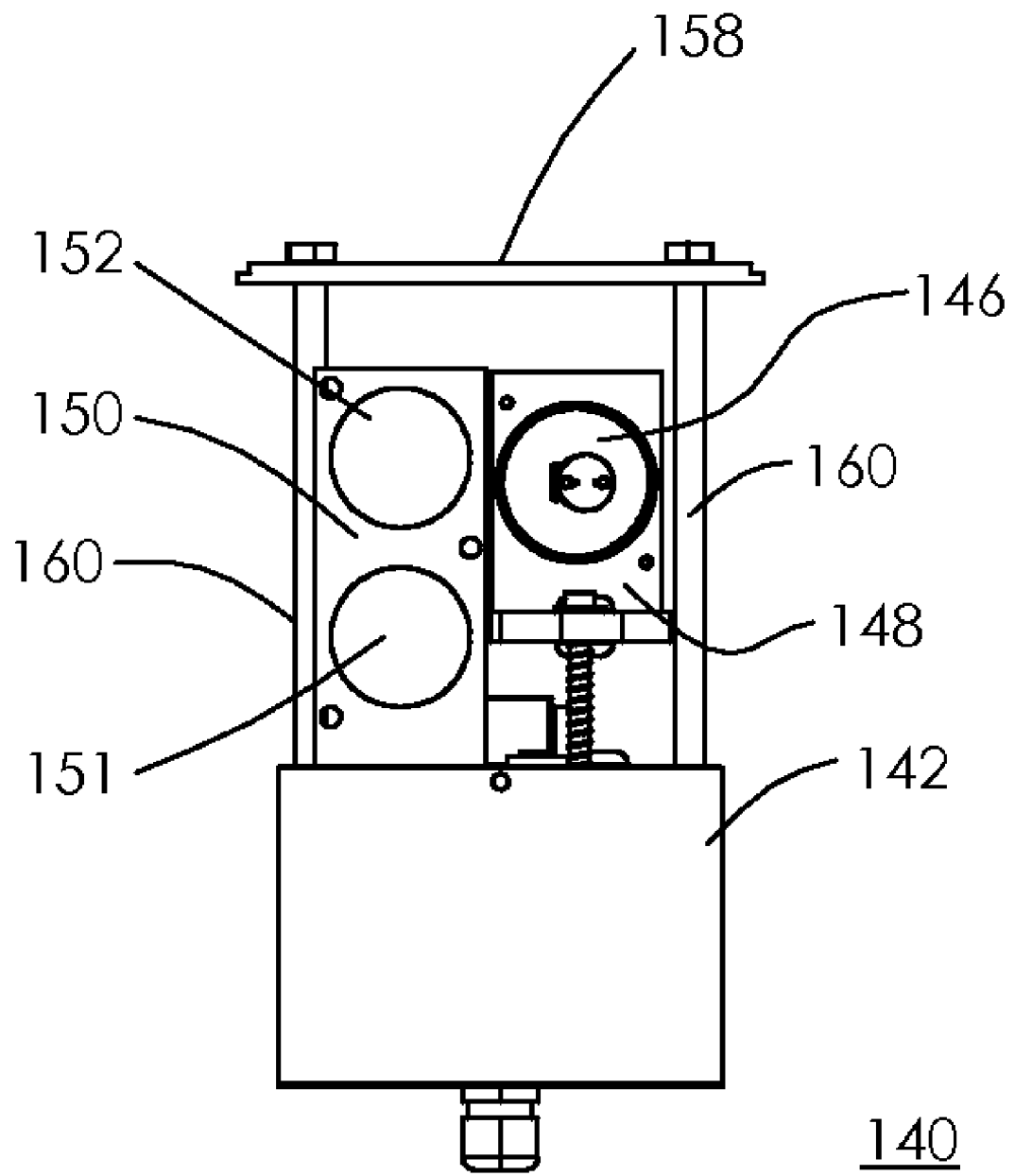
FIG. 10 is a proximal elevation of the lamp capsule thereof.
Figure 11:
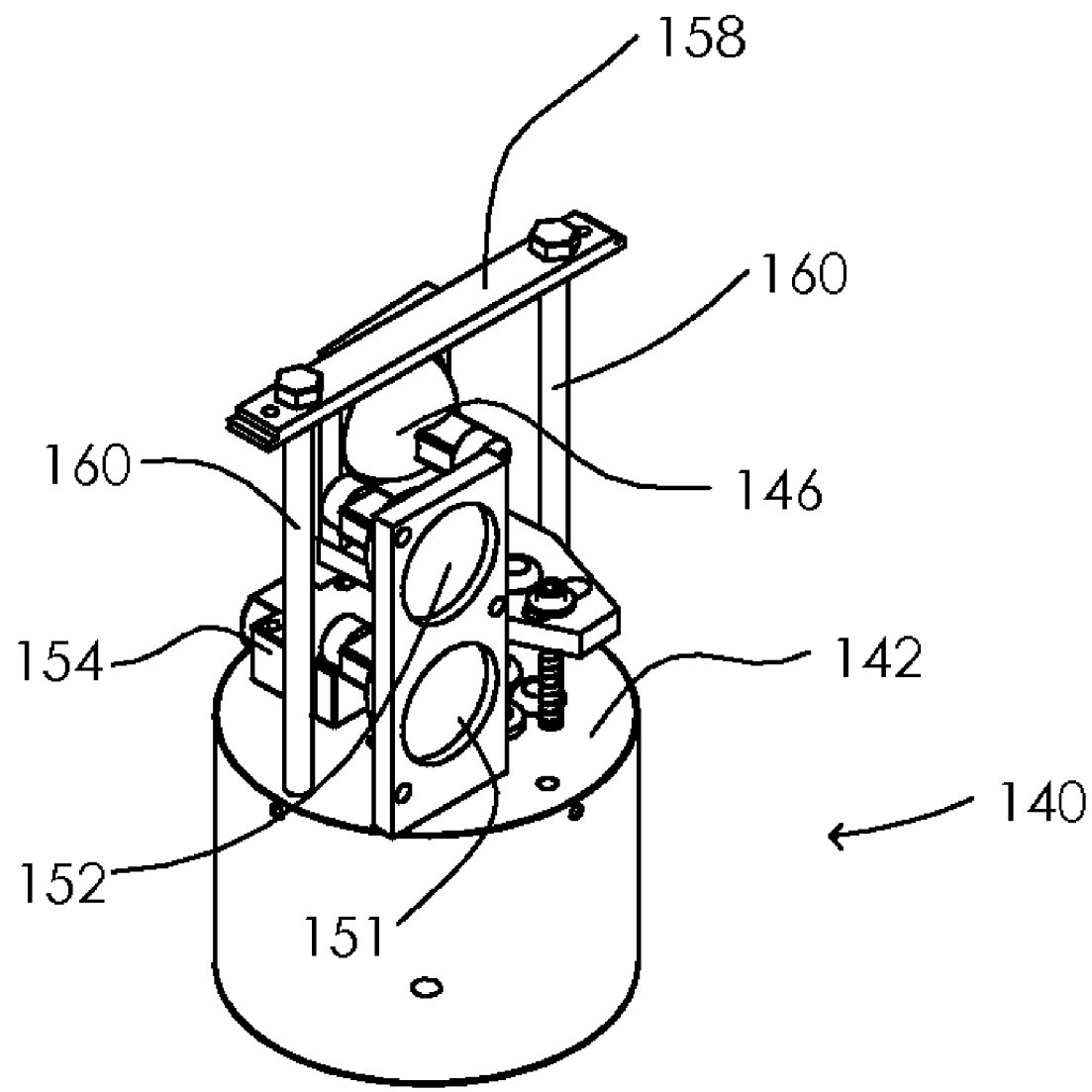
FIG. 11 is a perspective view of the lamp capsule thereof.

The bollard light 120 has a tubular metal body 125, as shown in FIGS. 6, 7, and 8, with a first lamp cutout 122 on the distal side for projecting light from the trailer lamp 146 and another cutout or opening 127 for the door sensor, i.e., electric eye 154. A second, oblong lamp cutout 129 is formed on the proximal or inward side of the bollard body 125 and this is the position where an indoor red/green safety light 150 is located. In this embodiment, there is a lamp assembly, module, or capsule 140 comprising all the inside electrical and lighting components. The lamp assembly 140 has a base plate 142, which comprises a flat disk as well as a generally cylindrical skirt, and this supports a lamp holder 148 for the trailer lamp 146, and also supports the safety light 150. The trailer lamp holder 148 can be adjusted in pitch and azimuth angle so that the lamp is properly aimed into the interior of the trailer or truck body. Here, the safety light 150 includes a red light 151 and a green light 152, supported one above the other in a vertical frame 153 that is mounted onto the base plate. The electric eye switch 154 is also mounted on the top of the base plate, and aligned with the opening 127. A power supply and control electronics module 156 is supported on an underside of the base plate 142. More details are also shown in FIGS. 9, 10 and 11.

A transverse hanger bar 158 is mounted horizontally above the base plate 142 and also above the trailer lamp 146 and safety light 150, and there are threaded studs or support rods 160 extending down through the base plate 142. The ends of the hanger bar 158 seat into notches 162 in the top edge or rim of the bollard tubular body 125, so that the lamp module or capsule 140 is supported by the hanger bar from above the cutouts 122, 127, 129, and there is no need for a sub-plate in this embodiment.

Power cables 164 extend down from the base of the module or capsule 140 to connect with the AC mains power.

Figure 12:
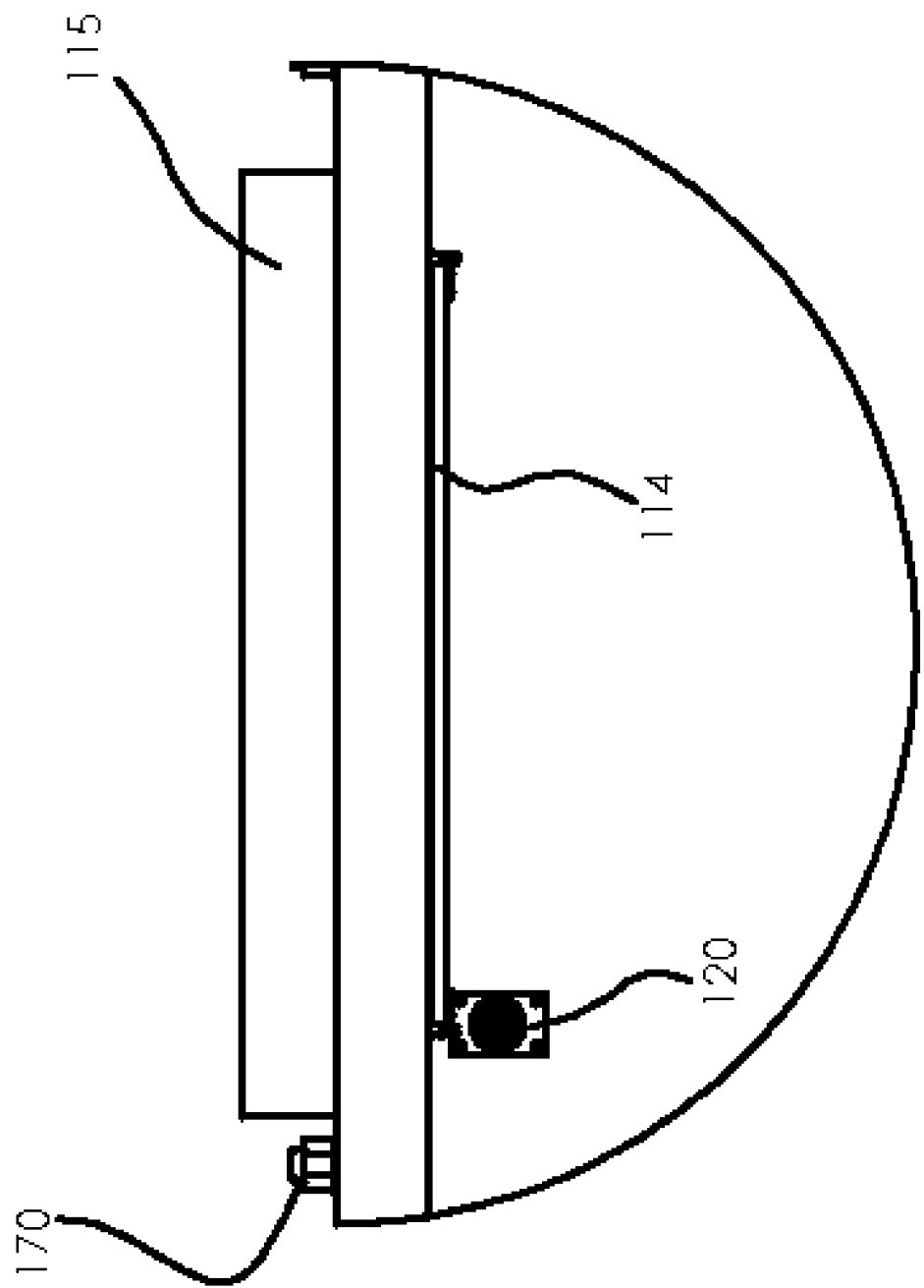
FIG. 12 is a plan view of the dock showing the bollard light of this invention and outside safety light unit.
Figure 13:
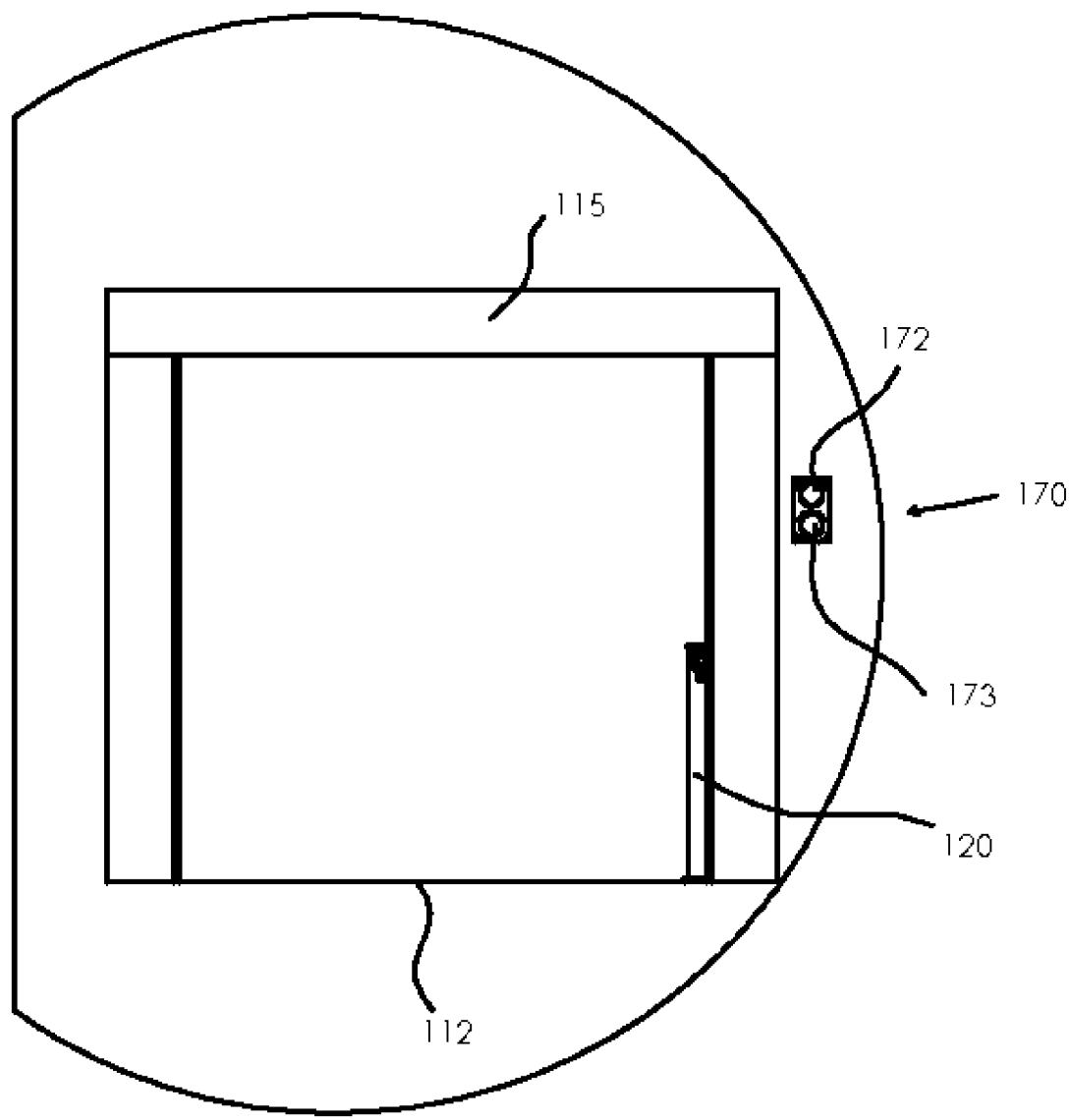
FIG. 13 is a perspective view showing the dock door, bollard light, and outside safety light unit.

As shown in the plan view of the loading dock in FIG. 12 and the exterior view thereof in FIG. 13, the light bollard 120 is placed at one side of the dock door 114, as in the first embodiment, so that the dock light or trailer light 146 shines into the interior of the trailer or truck body that is to be loaded or unloaded. The safety light 150 is then visible to the operator on the interior of the loading dock through the elongated opening 129 on the proximal side of the bollard. The electric eye switch 154 detects whether the loading dock door 114 is open or closed, and switches the green lamp 152 on if the door is open, but switches the red lamp 151 on if the door is closed. On the outside of the loading dock opening 112, to the right side of the dock door 114, an exterior safety light unit 170 is positioned so that it is visible to a truck or tractor operator at the loading dock. The exterior unit has a red light 172 and a green light 173, and is coupled with the bollard safety light 150 and electric eye switch 154 such that when the dock door is detected to be open, the red light 172 is on, and when the dock door is detected to be closed, the green light 173 is on. A low-voltage electric cable (not shown) can connect the bollard 120 with the exterior safety light unit 170, such that there are no electrical cables that are exposed to traffic in the warehouse and there is minimal obstruction on the walls near the dock opening.

A dock seal 115 is shown in FIG. 12.

In practice, the bollards 20, 120 of this invention are of metal, i.e., steel, construction, but it is recognized that many durable non-metallic rigid materials may be available, and could serve as equivalents to the tubular metal bodies 25, 125.

While the invention has been described with reference to specific preferred embodiments, the invention is certainly not limited to those precise embodiments. Rather, many modifications and variations will become apparent to persons of skill in the art without departure from the scope and spirit of this invention, as defined in the appended claims.

We claim:

1. Illuminated bollard adapted to be installed adjacent a loading dock door and to provide illumination into a truck body or trailer positioned at said loading dock door and distally thereof and providing safety signalling visible to an operator proximal of the loading dock door; the illuminated bollard comprising:
   a vertical tubular rigid body;
   means affixing a base of said tubular rigid body to a horizontal floor surface;
   a first window cutout formed at an upper end of said bollard tubular rigid body on a distal-facing side thereof;
   a second window cutout formed at the upper end of said bollard tubular rigid body on a proximal-facing side thereof; and
   a lamp assembly disposed within the upper end of said bollard tubular rigid body, and including:
   (a) a base plate;
   (b) a directional lamp supported upon said base plate and providing a beam of light oriented in the distal direction through said first window cutout;
   (c) a safety light arrangement that includes a red light and a green light, supported on said base plate and providing red and green light signals visible through said second window cutout;
   (d) an automatic door sensor switch adapted to switch said directional lamp on when said loading dock door is opened and to switch the directional lamp off when said loading dock door is closed, said sensor switch being further operative to actuate said safety light arrangement to provide green light when said loading dock door is opened and to provide red light when said loading dock door is closed; and
   (e) a power supply that provides electrical power to said directional lamp and to said safety light arrangement.

2. The illuminated bollard of claim 1 wherein said directional lamp, said safety light arrangement, said automatic sensor switch, and said power supply are all mounted on said base plate.

3. The illuminated bollard of claim 2 wherein said directional lamp includes a lamp holder adjustably supported above said base plate to hold said lamp in a generally horizontal orientation.

4. The illuminated bollard of claim 3 wherein said means for supporting includes at least one compression spring situated between said lamp holder and said base plate, and at least one threaded screw passing through said lamp holder and said compression spring into said base plate.

5. The illuminated bollard of claim 2 wherein said safety light arrangement includes a red lamp and a green lamp superposed one above the other.

6. The illuminated bollard of claim 1 wherein said automatic sensor switch includes an optical switch.

7. The illuminated bollard of claim 6 wherein said optical switch is positioned on said base plate and is optically aligned with a window opening in said bollard tubular rigid body.

8. The illuminated bollard of claim 7 wherein said optical switch includes a photo eye unit operative to detect light reflected from said loading dock door when the door is closed.

9. The illuminated bollard of claim 1 further comprising an outside safety light unit adapted to be mounted alongside said dock door and having a green light and a red light; and electrical cabling connecting the outside safety light unit to said automatic door sensor switch.

10. The illuminated bollard of claim 1 wherein said lamp assembly capsule further includes a transverse hanger bar positioned above said base plate and over said directional lamp and said safety light arrangement; and adapted to fit into supporting structure in the bollard tubular rigid body above said window cutouts.

* * * * *